US012577391B2

(12) United States Patent
Bihari et al.

(10) Patent No.: US 12,577,391 B2
(45) Date of Patent: Mar. 17, 2026

(54) CHEMICALLY-RESISTANT FLAME RETARDANT COMPOSITIONS

(71) Applicant: SHPP Global Technologies B.V., Bergen op Zoom (NL)

(72) Inventors: Malvika Bihari, Evansville, IN (US); Peter Vollenberg, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 657 days.

(21) Appl. No.: 18/003,360

(22) PCT Filed: Jun. 30, 2021

(86) PCT No.: PCT/IB2021/055869
§ 371 (c)(1),
(2) Date: Dec. 27, 2022

(87) PCT Pub. No.: WO2022/003594
PCT Pub. Date: Jan. 6, 2022

(65) Prior Publication Data

US 2023/0323110 A1 Oct. 12, 2023

Related U.S. Application Data

(60) Provisional application No. 63/046,244, filed on Jun. 30, 2020.

(51) Int. Cl.

| | |
|---|---|
| ***C08L 67/02*** | (2006.01) |
| ***C08L 69/00*** | (2006.01) |
| ***C08L 83/10*** | (2006.01) |

(52) U.S. Cl.
CPC ............... *C08L 67/02* (2013.01); *C08L 69/00* (2013.01); *C08L 83/10* (2013.01); *C08L 2205/025* (2013.01); *C08L 2205/035* (2013.01)

(58) Field of Classification Search
CPC ........... C08L 67/02; C08L 69/00; C08L 83/10
See application file for complete search history.

(56) References Cited

U.S. PATENT DOCUMENTS

| | | | |
|---|---|---|---|
| 2,465,319 | A | 3/1949 | Rex et al. |
| 4,155,898 | A | 5/1979 | Bopp et al. |
| 5,367,011 | A | 11/1994 | Walsh |
| 5,411,999 | A | 5/1995 | Gallucci |
| H1901 | H | 10/2000 | Mason |
| 7,615,594 | B2 | 11/2009 | Hashimoto et al. |
| 9,006,324 | B2 | 4/2015 | Sybert et al. |
| 9,598,577 | B1 | 3/2017 | Groote et al. |

FOREIGN PATENT DOCUMENTS

| | | |
|---|---|---|
| CN | 106029778 | 10/2016 |
| CN | 108026364 | 5/2018 |
| CN | 108699327 | 10/2018 |
| EP | 2468818 | 11/2014 |
| WO | WO 2008042500 | 4/2008 |
| WO | WO 2010076680 | 7/2010 |
| WO | WO 2016174592 | 11/2016 |
| WO | WO 2019/123029 | 6/2019 |

OTHER PUBLICATIONS

Office Action issued in corresponding Chinese Application No. 2021800519558, dated May 17, 2025.
International Search Report and Written Opinion issued in corresponding International PCT/IB2021/055869 mailed Sep. 23, 2021.

*Primary Examiner* — Kregg T Brooks
*Assistant Examiner* — David R. Foss
(74) *Attorney, Agent, or Firm* — NORTON ROSE FULBRIGHT US LLP

(57) ABSTRACT

Thermoplastic compositions, methods of making the compositions, and articles including the compositions are described. The thermoplastic compositions can contain 30 wt. % to 70 wt. % of a semi-crystalline polyester, 10 wt. % to 50 wt. % of a halogenated polycarbonate, 3 wt. % to 25 wt. % of a first poly(carbonate-siloxane) copolymer having a siloxane content of less than 30 wt. %, wherein the siloxane content is based on the total weight of the first poly(carbonate-siloxane) copolymer, and 3 wt. % to 25 wt. % of a second poly(carbonate-siloxane) copolymer having a siloxane content of greater than 30 wt. %, wherein the siloxane content is based on the total weight of the second poly(carbonate-siloxane) copolymer.

15 Claims, No Drawings

CHEMICALLY-RESISTANT FLAME RETARDANT COMPOSITIONS

CROSS-REFERENCE TO RELATED APPLICATIONS

This application is a national phase application under 35 U.S.C. § 371 of International Application No. PCT/IB2021/055869 filed Jun. 30, 2021, which claims the benefit of priority of U.S. Provisional Application No. 63/046,244 filed 30 Jun. 2020, which are hereby incorporated by reference in their entirety.

BACKGROUND OF THE INVENTION

A. Field of the Invention

The invention generally concerns chemically resistant and flame retardant thermoplastic compositions. In one aspect, the thermoplastic compositions can have a UL94 rating of V0 at a thickness of 1.5 mm. In another aspect, the thermoplastic compositions can have, a tensile strength retention of at least 80%, and/or a tensile elongation retention of at least 65% after exposure to a selected chemical for 168 hours.

B. Description of Related Art

In various devices including those used in the healthcare industry, metallic parts are being replaced by thermoplastic containing materials that are lighter in weight and offer a robust combination of mechanical properties. While thermoplastic materials have some advantageous properties over metallic parts, such materials should also have relatively good flame retardant properties and/or good chemical resistance against sanitizers. This can be particularly important for devices and products used in the healthcare industry. New classes of sanitizers have been developed to fight healthcare-acquired infections (HAIs)-infections that patients get while receiving treatment for medical or surgical conditions and to prevent new virus induced diseases. These newer classes of sanitizers are more effective but also more aggressive in nature towards plastic materials.

Attempts have been made to make thermoplastic composition with good chemical resistance against sanitizers and acceptable flame retardant properties (see, e.g., EP2468818B1). Such attempts, however, typically fail to achieve the desired properties, especially for uses or applications in the health care field. While additives can be used with these thermoplastic compositions, such additives typically are not sufficient to increase the chemical resistance against sanitizers and flame retardant properties to meet the stringent demands of the health care field.

SUMMARY OF THE INVENTION

A discovery has been made that provides a solution to at least some of the problems associated with thermoplastic compositions. In one aspect, the discovery can include providing a thermoplastic composition having particular amounts of semi-crystalline polyester in combination with two or more poly(carbonate-siloxane) copolymers and halogenated polycarbonate. This combination can result in a thermoplastic composition that can meet the demands of the health care field. By way of example, and as illustrated in non-limiting embodiments in the Examples section, thermoplastic compositions of the present invention can have (1) a UL94 rating of V0 at a thickness of 1.5 mm or 1 mm and/or (2) good chemical resistance properties. In one aspect, the chemical resistance properties can be measured by obtaining an ASTM tensile bar comprising a thermoplastic composition of the present invention, and the composition can have a tensile strength retention of at least 80% or more after exposure of the bar for 168 hours to SANI-CLOTH AF3 at a temperature of 23° C. under 0.5% or 1% strain compared to a non-exposed reference composition tested at the same condition, and a tensile elongation retention of at least 65% or more after exposure of the bar for 168 hours to SANI-CLOTH AF3 at a temperature of 23° C. under 0.5% or 1% strain compared to a non-exposed reference composition tested at the same condition.

One aspect of the present invention is directed to a thermoplastic composition. The thermoplastic composition can contain a semi-crystalline polyester, a halogenated polycarbonate, a first poly(carbonate-siloxane) copolymer having a siloxane content of less than 30 wt. %, wherein the siloxane content of the first poly(carbonate-siloxane) copolymer is based on the total weight of the first poly(carbonate-siloxane) copolymer, and a second poly(carbonate-siloxane) copolymer having a siloxane content of greater than 30 wt. %, wherein the siloxane content of the second poly(carbonate-siloxane) copolymer is based on the total weight of the second poly(carbonate-siloxane) copolymer. The thermoplastic composition can have desirable flame-retardant properties. In some aspects, a molded sample of thermoplastic compositions disclosed herein can achieve a UL94 V0 rating at a thickness of 1.5 mm. An ASTM tensile bar containing the composition can have a) a tensile strength retention of 80% or higher, or 85% or higher, or 90% or higher, or 95% or higher or 80% to 100% or 90% to 100% or 95% to 100%, after exposure of the bar for 168 hours to SANI-CLOTH AF3 at a temperature of 23° C. under 0.5% or 1% strain compared to a non-exposed reference tested at the same condition, and/or b) a tensile elongation retention of 65% and higher, or 70% and higher, or 72% and higher, or between 72% to 139%, after exposure of the bar for 168 hours to SANI-CLOTH AF3 at a temperature of 23° C. under 0.5% or 1% strain compared to a non-exposed reference tested at the same condition. An ASTM tensile bar containing the composition can have a) a tensile strength retention of 90% or higher, or 95% or higher or 95% to 100%, after exposure of the bar for 72 hours to SANI-CLOTH AF3 at a temperature of 23° C. under 0.5% or 1% strain compared to a non-exposed reference tested at the same condition, and/or b) a tensile elongation retention of 75% and higher, or 80% and higher, or between 80% to 139%, after exposure of the bar for 72 hours to SANI-CLOTH AF3 at a temperature of 23° C. under 0.5% or 1% strain compared to a non-exposed reference tested at the same condition. In some aspects, the thermoplastic composition can contain 30 wt. % to 70 wt. % of the semi-crystalline polyester. In some aspects, the thermoplastic composition can contain 10 wt. % to 50 wt. % of the halogenated polycarbonate. In some aspects, the thermoplastic composition can contain 3 wt. % to 25 wt. % of the first poly(carbonate-siloxane) copolymer. In some aspects, the thermoplastic composition can contain 3 wt. % to 25 wt. % of the second poly(carbonate-siloxane) copolymer. In some particular aspects, the thermoplastic composition can contain 30 wt. % to 70 wt. % of the semi-crystalline polyester, 10 wt. % to 50 wt. % of the halogenated polycarbonate, 3 wt. % to 25 wt. % of the first poly(carbonate-siloxane) copolymer, and 3 wt. % to 25 wt. % of the second poly(carbonate-siloxane) copolymer. The semicrystalline polyester can be a poly(alkylene terephthalate). The poly (alkylene terephthalate) can be poly(butylene terephthalate) (PBT) and/or poly(ethylene terephthalate) (PET). In some aspects, poly(alkylene terephthalate) can be PBT. In some aspects, the thermoplastic composition can contain more than one polyester. In some aspects, the thermoplastic composition can contain 20 wt. % to 50 wt. % of a first PBT, 0 wt. % to 20 wt. % of a second PBT, and 0 wt. % to 20 wt. % of the PET with total semicrystalline polyester content being 30 wt. % to 70 wt. %. The first PBT can have an intrinsic viscosity of 1 to 1.5 deciliter/gram (dl/g) as measured in a 60:40 phenol/tetrachloroethane mixture. The second PBT can have a can have an intrinsic viscosity of 0.3 to 0.9 deciliter/gram (dl/g) as measured in a 60:40 phenol/tetrachloroethane mixture. The polyester can be a mechanically recycled and/or chemically upcycled material. The halogenated polycarbonate can be a brominated polycarbonate. The brominated polycarbonate can contain brominated carbonate units. In some aspects, the brominated polycarbonate can contain brominated carbonate units derived from 2,2',6,6'-tetrabromo-4,4'-isopropylidenediphenol (2,2-bis(3,5-dibromo-4-hydroxyphenyl) propane) (TBBPA) and carbonate units derived from at least one dihydroxy aromatic compound that is not TBBPA.

In some aspects, the first poly(carbonate-siloxane) copolymer can have a siloxane content of 3 to 25 wt. %, based on the total weight of the first poly(carbonate-siloxane) copolymer. In some aspects, the first poly(carbonate-siloxane) copolymer can have a siloxane content of 3 to 10 wt. %, based on the total weight of the first poly(carbonate-siloxane) copolymer. In some aspects, the first poly(carbonate-siloxane) copolymer can have a siloxane content of 15 to 25 wt. %, based on the total weight of the first poly(carbonate-siloxane) copolymer. In some aspects, the first poly(carbonate-siloxane) copolymer can have a siloxane content of about 6 wt. %, based on the total weight of the first poly(carbonate-siloxane) copolymer. In some aspects, the first poly(carbonate-siloxane) copolymer can have a siloxane content of about 20 wt. %, based on the total weight of the first poly(carbonate-siloxane) copolymer. In some aspects, the second poly(carbonate-siloxane) copolymer can have a siloxane content of greater than 30 to 50 wt. %, preferably 35 to 45 wt. %, based on the total weight of the second poly(carbonate-siloxane) copolymer. In some aspects, the second poly(carbonate-siloxane) copolymer can have a siloxane content of about 40 wt. %, based on the total weight of the second poly(carbonate-siloxane) copolymer. In some particular aspects, the thermoplastic composition can contain 40 wt. % to 60 wt. % of PBT, 15 wt. % to 25 wt. % of the halogenated polycarbonate, where the halogenated polycarbonate is a brominated polycarbonate, 5 wt. % to 15 wt. % of the first poly(carbonate-siloxane) copolymer having a siloxane content of 3 wt. % to 10 wt. %, where the siloxane content of the first poly(carbonate-siloxane) copolymer is based on the total weight of the first poly(carbonate-siloxane) copolymer; and 5 wt. % to 15 wt. % of the second poly(carbonate-siloxane) copolymer having a siloxane content of 35 wt. % to 45 wt. %, where the siloxane content of the second poly(carbonate-siloxane) copolymer is based on the total weight of the second poly(carbonate-siloxane) copolymer. In some particular aspects, the thermoplastic composition can contain 25 wt. % to 50 wt. % of the high molecular PBT, 10 wt. % to 25 wt. % of the low molecular weight PBT, 15 wt. % to 25 wt. % of the halogenated polycarbonate, where the halogenated polycarbonate is a brominated polycarbonate, 5 wt. % to 15 wt. % of the first poly(carbonate-siloxane) copolymer having a siloxane content of 3 wt. % to 10 wt. %, where the siloxane content of the first poly(carbonate-siloxane) copolymer is based on the total weight of the first poly(carbonate-siloxane) copolymer; and 5 wt. % to 15 wt. % of the second poly(carbonate-siloxane) copolymer having a siloxane content of 35 wt. % to 45 wt. %, where the siloxane content of the second poly(carbonate-siloxane) copolymer is based on the total weight of the second poly(carbonate-siloxane) copolymer. In some aspects, the thermoplastic composition can further contain an antimony oxide and/or an impact modifier. In some aspects, the thermoplastic composition can contain 1 wt. % to 10 wt. % of the antimony oxide and 5 wt. % to 20 wt. % of the impact modifier. In some aspects, the impact modifier can be a methyl methacrylate-butadiene-styrene (MBS) core-shell impact modifier and/or a silicone-acrylic-based rubber impact modifier. In some aspects, the thermoplastic composition can further contain one or more additives selected from fillers, reinforcing agents, sealant, toughening agent/dispersion agent, anti-oxidants, heat stabilizers, light stabilizers, ultraviolet light (UV) absorbers, plasticizers, lubricants, mold release agents, antistatic agents, colorants, blowing agents, melt strength additives, flame retardants, flame retardant synergists, quenchers, and anti-drips. In some aspects, the thermoplastic composition can contain a toughening agent/dispersion agent, mold release agent, quenchers, anti-oxidants, and anti-drips. In some aspects, the toughening agent/dispersion agent can contain ethyl vinyl acetate (EVA) polymer. In some particular aspects, the EVA polymer can have a vinyl acetate content of 15 wt. % to 45 wt. %. In some aspects, the mold release can be pentaerythritol tetrastearate. In some aspects, the quencher can be a metal containing quencher. In some aspects, the quencher can be zinc phosphate such as mono zinc phosphate. In some aspects, the anti-oxidant can be hindered phenol anti-oxidant. In some aspects, the anti-oxidant can be pentaerythritol tetrakis(3-(3,5-di-tert-butyl-4-hydroxyphenyl) propionate). In some aspects, the anti-drip can be polytetrafluoroethylene (PTFE) containing anti-drip. In some aspects, the anti-drip can be PTFE encapsulated by styrene-acrylonitrile (SAN), known as (TSAN).

Optionally, the thermoplastic compositions of the present invention can contain less than 10 wt. %, less than 5 wt. %, or less than 2 wt. % of polycarbonate homopolymers such as bisphenol A polycarbonate homopolymer. As used herein, "less than 10 wt. %," "less than 5 wt. %," and "less than 2 wt. %" mean "zero to less than 10 wt. %," "zero to less than 5 wt. %," and "zero to less than 2 wt. %" respectively. In a specific embodiment, the thermoplastic compositions are free of polycarbonate homopolymers.

In some aspects, the thermoplastic composition can have a melt volume rate (MVR) of greater than 5 cc/10 min, preferably 9 cc/10 min to 12 cc/10 min as measured at 250° C., 5 kg, 360 sec, in accordance with ASTM D1238. In some aspects, the thermoplastic composition can have a Vicat softening point higher than 110° C., preferably 112° C. to 145° C., at 50 N load, rate 120° C./h, as measured in accordance with ASTM D1525. In some aspects, the thermoplastic composition can have a notched Izod impact strength greater than 350 J/m, preferably 450 J/m to 700 J/m at 23° C., 5.5 Joules pendulum energy as measured in accordance with ASTM D256. In some aspects, notched Izod impact strength can be measured in molded bar of 3.2 mm thickness. In some aspects, the thermoplastic composition can have a tensile modulus greater than 1800 MPa, preferably 1900 MPa to 2200 MPa at 23° C., 50 mm/min as measured in accordance with ASTM D638. In some aspects, the thermoplastic composition can have an elongation at break greater than 35% at 23° C., 50 mm/min as measured in accordance with ASTM D638. In some aspects, the thermoplastic composition can have a ductility of at least 80%, preferably 80% to 100% at 23° C. under multiaxial impact strength test conditions per ASTM D3763. In some aspects, the thermoplastic composition can have a combination of or all of the properties discussed herein. In some aspects, the measurement conditions for the properties can be the respective conditions provided in Tables 1 and 2.

The thermoplastic compositions of the present invention can be an extruded, blow-molded, injection-molded, rotational molded and/or thermoformed composition. In some aspects, the thermoplastic compositions can be comprised in or formed into an article of manufacture. In some aspects, the article of manufacture can be opaque. In some aspects, the article of manufacture can be a healthcare product. In some particular aspects, the article of manufacture can be a transfusion joint, a monitor housing, a blood filter housing, an intravenous connector, a dialyzer, a catheter, a medical storage tray, a medical appliance, a medical tubing, a cannula, an extra-corporeal device, a pacemaker lead, a defibrillator lead, a blood pump, a balloon pump, a A-V shunt, a biosensor, a membrane for cell encapsulation, a food tray, an animal cage, a cable sheathing, a structural component for pumps and vehicles, a mining ore screen, a mining conveyor belt, an aeronautical component, a chocolate mold, a watercooker component, a washer component, a dishwasher component, a or dishwasher safe article. The article of manufacture can be an extruded, a blow-molded, an injection-molded, rotational molded and/or thermoformed article.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions the invention can be used to achieve methods of the invention.

The following includes definitions of various terms and phrases used throughout this specification.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The thermoplastic composition of the present invention can "comprise," "consist(s) essentially of," or "consist of" particular ingredients, components, compositions, etc. disclosed throughout the specification. In one aspect of the present invention, and with reference to the transitional phrase "consist(s) essentially of" or "consisting essentially of," a basic and novel characteristic of the present invention can include the thermoplastic compositions having (1) good chemical resistance against sanitizers and/or (2) good flame retardance.

All publications mentioned herein are incorporated herein by reference to disclose and describe the methods and/or materials in connection with which the publications are cited.

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

DETAILED DESCRIPTION OF THE INVENTION

A discovery has been made that provides a solution to at least some of the problems associated with thermoplastic compositions that may not meet the increased flame retardant and/or chemical resistant demands of various industries (e.g., health care industry). In one aspect, the discovery can include a thermoplastic composition containing 30 wt. % to 70 wt. % of a semi-crystalline polyester; 10 wt. % to 50 wt. % of a halogenated polycarbonate; 3 wt. % to 25 wt. % of a first poly(carbonate-siloxane) copolymer having a siloxane content of less than 30 wt. %; and 3 wt. % to 25 wt. % of a second poly(carbonate-siloxane) copolymer having a siloxane content of greater than 30 wt. %, wherein the siloxane content of the poly(carbonate-siloxane) copolymers are based on the total weight of the respective poly(carbonate-siloxane) copolymers. As illustrated in a non-limiting manner in the Examples, ASTM tensile bars containing the polymer compositions of the current invention can have a tensile strength retention of at least 80% or more after exposure of the bar for 168 hours to SANI-CLOTH AF3 at a temperature of 23° C. under 0.5% or 1% strain compared to a non-exposed reference composition tested at the same condition, and a tensile elongation retention of at least 65% or more after exposure of the bar for 168 hours to SANI-CLOTH AF3 at a temperature of 23° C. under 0.5% or 1% strain compared to a non-exposed reference composition tested at the same condition.

These and other non-limiting aspects of the present invention are discussed in further detail in the following sections.

A. Chemically-Resistant, Flame Retardant Thermoplastic Compositions

In some aspects, the thermoplastic composition can contain i) 30 wt. % to 70 wt. %, or 35 wt. % to 60 wt. %, or 40 wt. % to 60 wt. %, or at least any one of, equal to any one of, or between any two of 30, 35, 39, 40, 45, 50, 55, 60, 65 and 70 wt. % of a semi-crystalline polyester, ii) 10 wt. % to 50 wt. %, or 15 wt. % to 40 wt. %, or 15 wt. % to 30 wt. %, or 15 wt. % to 25 wt. %, or at least any one of, equal to any one of, or between any two of 10, 15, 20, 25, 30, 35, 40, 45 and 50 wt. % of the halogenated polycarbonate such as brominated polycarbonate, iii) 3 wt. % to 25 wt. %, or 5 wt. % to 15 wt. %, or at least any one of, equal to any one of, or between any two of 3, 5, 8, 10, 12, 15, 18, 20, 22 and 25 wt. % of the first poly(carbonate-siloxane) copolymer, and iv) 3 wt. % to 25 wt. %, or 5 wt. % to 15 wt. % or at least any one of, equal to any one of, or between any two of 3, 5, 8, 10, 12, 15, 18, 20, 22 and 25 wt. % of the second poly(carbonate-siloxane) copolymer.

In some aspects, the thermoplastic composition can further contain v) 1 wt. % to 10 wt. % or at least any one of, equal to any one of, or between any two of 1, 2, 3, 4, 5, 6, 7, 8, 9 and 10 wt. % of antimony oxide and vi) 5 wt. % to 20 wt. % or at least any one of, equal to any one of, or between any two of 5, 6, 7, 8, 9, 10, 11, 12, 13, 14, 15, 16, 17, 18, 19 and 20 wt. % of an impact modifier. The antimony oxide can be antimony trioxide ($Sb_2O_3$), antimony pentoxide ($Sb_2O_5$), and/or antimony-metal compounds, such as sodium antimonate ($Na_2SbO_4$). In some aspects, the antimony oxide can be $Sb_2O_3$.

In some aspects, the thermoplastic composition can further contain vii) 0.01 to 2 wt. % or at least any one of, equal to any one of, or between any two of 0.01, 0.1, 0.2, 0.4, 0.6, 0.8, 1, 1.2, 1.4, 1.6, 1.8, and 2 wt. % of a toughening agent/dispersion agent, viii) 0.01 to 1 wt. % or at least any one of, equal to any one of, or between any two of 0.01, 0.05, 0.1, 0.2, 0.4, 0.6, 0.8, and 1 wt. % of a mold release agent, ix) 0.01 to 1 wt. % or at least any one of, equal to any one of, or between any two of 0.01, 0.05, 0.1, 0.2, 0.4, 0.6, 0.8, and 1 wt. % of aquencher, x) 0.005 to 0.1 wt. % or at least any one of, equal to any one of, or between any two of 0.005, 0.01, 0.02, 0.04, 0.06, 0.08, and 0.1 wt. % of an anti-oxidants and xi) 0.01 to 1 wt. % or at least any one of, equal to any one of, or between any two of 0.01, 0.05, 0.1, 0.2, 0.4, 0.6, 0.8, and 1 wt. % of an anti-drip agent.

1. Semicrystalline Polyester

The semicrystalline polyesters for use in the present flame retardant compositions having repeating structural units of formula (1)

(1)

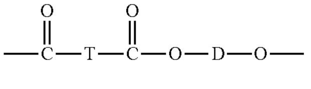

wherein each T is independently the same or different divalent $C_{6-10}$ aromatic group derived from a dicarboxylic acid or a chemical equivalent thereof, and each D is independently a divalent $C_{2-4}$ alkylene group derived from a dihydroxy compound or a chemical equivalent thereof. Copolyesters containing a combination of different T and/or D groups can be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters can be branched or linear.

Exemplary semicrystalline polyesters include poly(alkylene terephthalate) ("PAT"), poly(1,4-butylene terephthalate), ("PBT"), poly(ethylene terephthalate) ("PET"), poly (ethylene naphthalate) ("PEN"), poly(butylene naphthalate), ("PBN"), poly(propylene terephthalate) ("PPT"), poly(cyclohexane dimethanol terephthalate) ("PCT"), poly(cyclohexane-1,4-dimethylene cyclohexane-1,4-dicarboxylate) also known as poly(1,4-cyclohexanedimethanol 1,4-dicarboxylate) ("PCCD"), poly(cyclohexanedimethanol terephthalate), poly(cyclohexylenedimethylene-co-ethylene terephthalate), cyclohexanedimethanol-terephthalic acid-isophthalic acid copolymers and cyclohexanedimethanol-terephthalic acid-ethylene glycol ("PCTG" or "PETG") copolymers. When the molar proportion of cyclohexanedimethanol is higher than that of ethylene glycol the polyester is termed PCTG. When the molar proportion of ethylene glycol is higher than that of cyclohexane dimethanol the polyester is termed PETG. In some aspects, the semicrystalline polyester can be PBT and/or PET. In some aspects, the semicrystalline polyester can be PBT. In some aspects, the polyester can be a mechanically recycled and/or chemically upcycled material.

The polyesters can be obtained by methods well known to those skilled in the art, including, for example, interfacial polymerization, melt-process condensation, solution phase condensation, and transesterification polymerization. Such polyester resins are typically obtained through the condensation or ester interchange polymerization of the diol or diol equivalent component with the diacid or diacid chemical equivalent component. Methods for making polyesters and the use of polyesters in thermoplastic molding compositions are known in the art. Conventional polycondensation procedures are described in the following, see, generally, U.S. Pat. Nos. 2,465,319, 5,367,011 and 5,411,999. The condensation reaction can be facilitated by the use of a catalyst, with the choice of catalyst being determined by the nature of the reactants. The various catalysts are known in the art. For example, a dialkyl ester such as dimethyl terephthalate can be transesterified with butylene glycol using acid catalysis, to generate poly(butylene terephthalate). It is possible to use a branched polyester in which a branching agent, for example, a glycol having three or more hydroxyl groups or a trifunctional or multifunctional carboxylic acid has been incorporated.

A combination of semi crystalline polyesters can be used, for example, a combination of virgin polyesters (polyesters derived from monomers rather than recycled polymer, including virgin poly(1,4-butylene terephthalate) can be used. In some aspects, a PBT can be used in combination with a poly(ethylene terephthalate), poly(1,4-butylene terephthalate), poly(ethylene naphthalate), poly(1,4-butylene naphthalate), poly(trimethylene terephthalate), poly(1,4-cyclohexanenedimethylene 1,4-cyclohexanedicarboxylate), poly(1,4-cyclohexanedimethylene terephthalate), poly(1,4- butylene-co-1,4-but-2-ene diol terephthalate), poly(cyclohexanedimethylene-co-ethylene terephthalate), or a combination thereof. In some aspects, the semicrystalline polyester can be PBT and/or PET. In some aspects, the thermoplastic composition can contain 20 wt. % to 50 wt. % or at least any one of, equal to any one of, or between any two of 20, 22, 24, 26, 28, 30, 32, 34, 35, 36, 38, 40, 42, 44, 46, 48 and 50 wt. % of a first PBT, 0 wt. % to 20 wt. % or at least any one of, equal to any one of, or between any two of 0, 2, 4, 6, 8, 10, 12, 14, 16, 18 and 20 wt. % of a second PBT, and 0 wt. % to 20 wt. % or at least any one of, equal to any one of, or between any two of 0, 2, 4, 6, 8, 10, 12, 14, 16, 18 and 20 wt. % of a PET, with total semicrystalline polyester content being 30 wt. % to 70 wt. %.

The first PBT can have an intrinsic viscosity of 1 to 1.5 deciliter/gram (dl/g) as measured in a 60:40 phenol/tetrachloroethane mixture at room temperature (RT). The second PBT can have an intrinsic viscosity of 0.3 to 0.9 dl/g as measured in a 60:40 phenol/tetrachloroethane mixture at room temperature (RT). In some aspects, the first PBT can have an intrinsic viscosity of 1.1-1.2 dl/g at room temperature (RT), and a carboxylic acid (COOH) end group content of 38 meq/Kg COOH. Such a first PBT is commercially available under the trade name VALOX 315 from SABIC. In some aspects, the second PBT can have an intrinsic viscosity of 0.66 dl/g at room temperature (RT), and a carboxylic acid (COOH) end group content of 17 meq/Kg COOH and is commercially available under the tradename VALOX 195 from SABIC. In some aspects, the PET can have an intrinsic viscosity of 0.4 to 2.0 deciliters per gram (dL/g) or 0.5 to 1.0 deciliters per gram (dL/g), measured in a 60:40 by weight phenol/tetrachloroethane mixture at room temperature (RT).

2. Halogenated Polycarbonate

The halogenated polycarbonate can include carbonate units. Suitable carbonate units are shown in formula (2)

(2)

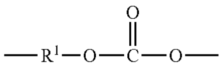

wherein at least 60 percent of the total number of $R^1$ groups can be aromatic, or each $R^1$ can contain at least one $C_{6-30}$ aromatic group. A combination of different $R^1$ groups can be present. The carbonate units can be derived from a dihydroxy compound such as an aromatic dihydroxy compound of formula (3) or a bisphenol of formula (4)

(3)

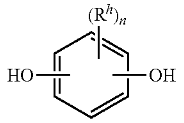

(4)

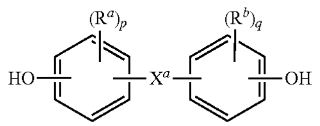

In some aspects, in formula (3), each Rh can be independently a halogen atom such bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n can be integers of 0 to 4. In some aspects, in formula (3), each Rh can be independently bromine, a $C_{1-3}$ alkyl, a halogen-substituted $C_{1-3}$ alkyl, and n can be 0 to 1.

In some aspects, in formula (4), $R^a$ and $R^b$ are each independently $C_{1-12}$ alkyl, $C_{2-12}$ alkenyl, $C_{3-8}$ cycloalkyl, halogen or $C_{1-12}$ alkoxy, p and q are each independently 0 to 4, such that when p or q is less than 4, the valence of each carbon of the ring is filled by hydrogen; and $X^a$ is a single bond, —O—, —S—, —S(O)—, —$S(O)_2$—, —C(O)—, a $C_{1-11}$ alkylidene of formula —$C(R^c)(R^d)$— wherein $R^c$ and $R^d$ are each independently hydrogen or $C_{1-10}$ alkyl, or a group of the formula —$C(=R^e)$— wherein $R^e$ is a divalent $C_{1-10}$ hydrocarbon group. In some aspects in formula (4), $R^a$ and $R^b$ each can be independently $C_{1-6}$ alkyl or $C_{1-3}$ alkoxy, and p and q each can be independently 0 to 1, and. In some particular aspects, in formula (4), p and q is each 0, or p and q is each 1; $R^a$ and $R^b$ are each a $C_{1-3}$ alkyl group, preferably methyl, disposed meta to the hydroxy group on each $C_6$ arylene group; and $X^a$ is a bridging group connecting the two hydroxy-substituted aromatic groups, where the bridging group and the hydroxy substituent of each $C_6$ arylene group are disposed para to each other on the $C^6$ arylene group, where $X^a$ can be a substituted or unsubstituted $C_{3-18}$ cycloalkylidene; a $C_{1-25}$ alkylidene of the formula —$C(R^c)(R^d)$— wherein $R^c$ and $R^d$ each can be independently hydrogen, $C_{1-12}$ alkyl, $C_{1-12}$ cycloalkyl, $C_{7-12}$ arylalkylene, $C_{1-12}$ heteroalkyl, or cyclic $C_{7-12}$ heteroarylalkylene, or a group of the formula —$C(=R^e)$— wherein Re is a divalent $C_{1-12}$ hydrocarbon group. In some aspects in formula (4), $R^a$ and $R^b$ each can be independently $C_{1-3}$ alkyl or $C_{1-3}$ alkoxy, p and q each can be independently 0 to 1, and $X^a$ can be a single bond, —O—, —S(O)—, —$S(O)_2$—, —C(O)—, a $C_{1-11}$ alkylidene of formula —$C(R^c)(R^d)$— wherein $R^c$ and $R^d$ each can be independently hydrogen or $C_{1-10}$ alkyl.

Some illustrative examples of dihydroxy compounds (4) that can be used are described, for example, in WO 2013/175448 A1, US 2014/0295363, and WO 2014/072923. Examples of aromatic dihydroxy compound of formula (3) can include but are not limited to resorcinol; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; or substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. In some aspects, a combination including different aromatic dihydroxy compounds can be used.

Examples of bisphenols of formula (4) can include TBBPA, 4,4'-dihydroxybiphenyl, 1,6-dihydroxynaphthalene, 2,6-dihydroxynaphthalene, bis(4-hydroxyphenyl) methane, bis(4-hydroxyphenyl)diphenylmethane, bis(4-hydroxyphenyl)-1-naphthylmethane, 1,2-bis(4-hydroxyphenyl) ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl) adamantane, alpha, alpha'-bis(4-hydroxyphenyl) toluene, bis(4-hydroxyphenyl) acetonitrile, 2,2-bis(3-methyl-4-hydroxyphenyl) propane, 2,2-bis(3-ethyl-4-hydroxyphenyl) propane, 2,2-bis(3-n-propyl-4-hydroxyphenyl) propane, 2,2-bis(3-isopropyl-4-hydroxyphenyl) propane, 2,2-bis(3-sec-butyl-4-hydroxyphenyl) propane, 2,2-bis(3-t-butyl-4-hydroxyphenyl) propane, 2,2-bis(3-cyclohexyl-4-hydroxyphenyl) propane, 2,2-bis(3-allyl-4-hydroxyphenyl) propane, 2,2-bis(3-methoxy-4-hydroxyphenyl) propane, 2,2-bis(4-hydroxyphenyl) hexafluoropropane, 1,1-dichloro-2,2-bis(4-hydroxyphenyl) ethylene, 1,1-dibromo-2,2-bis(4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl) ether, bis(4-hydroxyphenyl) ether, bis(4-hydroxyphenyl) sulfoxide, bis(4-hydroxyphenyl) sulfone, 9,9-bis(4-hydroxyphenyl) fluorene, 2,7-dihydroxypyrene, 6,6'-dihydroxy-3,3,3',3'-tetramethylspiro(bis) indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 2,7-dihydroxycarbazole, or the like. In some aspects, a combination including different bisphenols can be used.

In some aspects, the halogenated polycarbonate can contain carbonate units derived from a halogen substituted dihydroxy compound e.g. in formula (3), nis 1 to 4, and at least one Rh is a halogen such as bromine, or in formula (4), p and/or q each are independently 1 to 4, and at least one $R^a$ and/or at least one $R^b$ is independently a halogen such as bromine. In some aspects, the halogenated polycarbonate can be a brominated polycarbonate containing carbonate units derived from TBBPA. In some aspects, the brominated polycarbonate can be a TBBPA copolymer and can contain brominated carbonate units derived from TBBPA and carbonate units derived from at least one dihydroxy aromatic compound, such as of formula (3) or (4), that is not TBBPA. In some aspects, the brominated polycarbonate can contain brominated carbonate units derived from TBBPA and carbonate units derived from 2,2-bis(4-hydroxyphenyl) propane (bisphenol A or BPA). In some aspects, the brominated polycarbonate can contain 30 wt. % to 70 wt. % or at least any one of, equal to any one of, or between any two of 35, 40, 45, 50, 55, 60, 65, and 70 wt. % of brominated carbonate units derived from TBBPA and 30 wt. % to 70 wt. % or at least any one of, equal to any one of, or between any two of 35, 40, 45, 50, 55, 60, 65, and 70 wt. % of carbonate units derived from BPA. In some aspects, the brominated polycarbonate can prepared by copolymerization of phosgene and a mixture of TBBPA and a dihydroxy aromatic compound, such as of formula (3) or (4), that is not TBBPA, such as bisphenol A. The relative ratio of TBBPA to the dihydroxy aromatic compound used to manufacture the TBBPA copolymer depends on the amount of the TBBPA copolymer used and the amount of bromine desired in the polycarbonate composition. In an aspect, the TBBPA copolymer is manufactured from a composition having 30 to 70 wt % of TBBPA and 30 to 70 wt % of the dihydroxy aromatic compound, preferably bisphenol A, or preferably 45 to 55 wt % of TBBPA and 45 to 55 wt % of the dihydroxy aromatic compound, preferably bisphenol A.

Combinations of different brominated polycarbonates, such as different TBBPA copolymers can be used. The TBBPA copolymer can have phenol endcaps such as 2,4,6-tribromophenol endcaps. In some aspects, the brominated polycarbonate, such as TBBPA copolymer can have a weight average molecular weight (Mw) of 18,000 to 30,000 Da, preferably 20,000 to 30,000 Da as measured by gel permeation chromatography (GPC) using a crosslinked styrene-divinylbenzene column and calibrated to bisphenol A polycarbonate references.

Suitable halogenated polycarbonate such as brominated polycarbonates have been described, for example, in U.S. Pat. No. 9,006,324 which is incorporated into the present application by reference.

3. First and Second Poly(Carbonate-Siloxane Copolymer)

The first and the second poly(carbonate-siloxane) copolymer can independently include carbonate units and siloxane units. Suitable carbonate units are shown in formula (2), (3) and/or (4) above.

In some aspects, the first and the second poly(carbonate-siloxane) copolymer can independently include carbonate units derived from resorcinol, 2,2-bis(4-hydroxyphenyl) propane (bisphenol A or BPA), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl) cyclohexane, or 1,1-bis(4-hydroxyphenyl)-3,3,5-trimethylcyclohexane (TMC bisphenol).

The siloxane units (also referred to as polysiloxane blocks) are of formula (6):

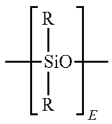

(6)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with fluorine, chlorine, bromine, or iodine, or a combination thereof. Combinations of the foregoing R groups can be used in the same copolymer.

In an aspect, R is a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another embodiment, R is methyl, trifluoromethyl, or phenyl.

The value of E in formula (6) can vary widely depending on the type and relative amount of each component in the thermoplastic compositions, the desired properties of the composition, and like considerations. Generally, E has an average value of 2 to 125, 5 to 80, or 10 to 100. Preferably, E has an average value of 20 to 60, or 30 to 50, or 40 to 50.

In an aspect, the siloxane units are of formula (7):

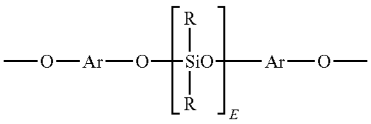

(7)

wherein E is as defined in formula (6); each R can be the same or different and is as defined above in the context of formula (6); and Ar can be the same or different and is a substituted or unsubstituted $C_{6-30}$ arylene, wherein the bonds are directly connected to an aromatic moiety. Ar groups in formula (7) can be derived from a $C_{6-30}$ dihydroxyarylene compound, for example a dihydroxy compound of formula (4). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) 2,2-bis(4-hydroxy-1-methylphenyl) propane, 1,1-bis(4-hydroxyphenyl)cyclohexane, bis(4-hydroxyphenyl sulfide), and 1,1-bis(4-hydroxy-t-butylphenyl) propane. Combinations comprising at least one of the foregoing dihydroxy compounds can also be used.

Specific examples of siloxane units of formula (7) include those of the formulas (7a) and (7b):

In an aspect, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, Mis methoxy, n is one, and $R^6$ is a divalent $C_{1-3}$ aliphatic group. Specific siloxane units are of the formula (7a)

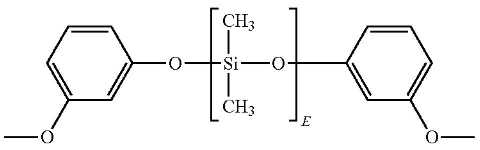

(7b)

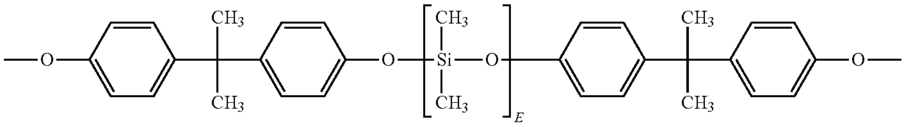

.

In another embodiment, the siloxane units are of formula (8):

(8)

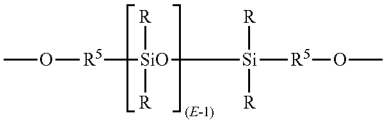

wherein R and E are as described in formula (6), and each $R^5$ is independently a divalent $C_1$-$C_{30}$ organic group, and wherein the polymerized polysiloxane unit is the reaction residue of its corresponding dihydroxy compound.

In a specific embodiment, the siloxane units are of formula (9):

(9)

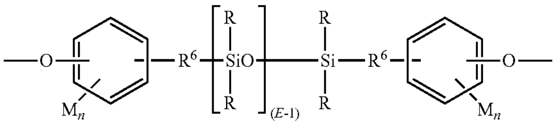

wherein R and E are as defined above in the context of formula (6). $R^6$ in formula (9) is a divalent $C_{2-8}$ aliphatic. Each M in formula (9) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ arylalkylenoxy, $C_{7-12}$ alkylarylene, or $C_{7-12}$ alkylarylenoxy, wherein each n is independently 0, 1, 2, 3, or 4.

(9a)

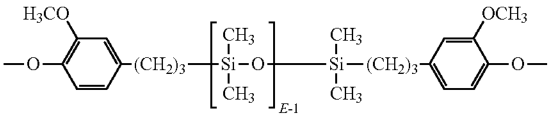

, (9b)

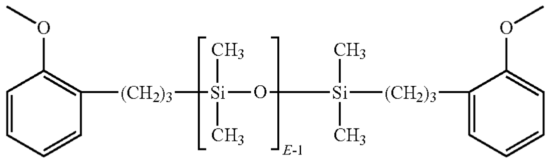

, (9c)

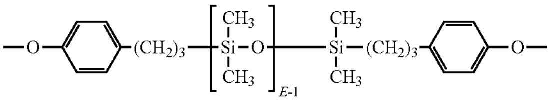

, or a combination thereof, wherein E has an average value of 10 to 100, preferably 20 to 80, or 30 to 70, more preferably 30 to 50 or 40 to 50.

Siloxane units of formula (9) can be derived from the corresponding dihydroxy polydiorganosiloxane of formula (10), (10)

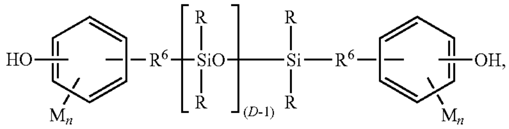

which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. The poly(carbonate-siloxane) can be manufactured by introducing phosgene under interfacial reaction conditions into a mixture of bisphenol and an end capped polydimethylsiloxane. Other known methods can also be used.

Suitable siloxane units have been described, for example, in WO 2008/042500 A1, WO 2010/076680 A1, and WO 2016/174592 A1, each of which are incorporated into the present application by reference.

In some aspects, the first poly(carbonate-siloxane) copolymer can include repeating carbonate units derived from bisphenol A and repeating PDMS (polydimethylsiloxane) units, wherein E has an average value of E has an average value of 10 to 100, preferably 20 to 80, or 30 to 70, more preferably 30 to 50 or 40 to 50. The first poly(carbonate-siloxane) copolymer can have a siloxane content less than 30 wt. %, such as 3 wt. % to 25 wt. %, or 3 wt. % to 10 wt. %, or 15 wt. % to 25 wt. %, or about 6 wt. % or about 20 wt., based on the total weight of the first poly(carbonate-siloxane) copolymer. In some aspects, the first poly(carbonate-siloxane) copolymer can have a Mw of 20,000 to 35,000 grams/mole as measured by gel permeation chromatography using a crosslinked styrene-divinyl benzene column, at a sample concentration of 1 milligram per milliliter, and as calibrated with bisphenol A polycarbonate standards. In some aspects, the first poly(carbonate-siloxane) copolymer can be p-cumylphenol (PCP) end-capped. In some aspects, a combination of the first poly(carbonate-siloxane) copolymers with different siloxane content and Mw can be used.

In an aspect, the second poly(carbonate-siloxane) comprises carbonate units derived from bisphenol A, and repeating siloxane units (7a), (7b), (9a), (9b), (9c), or a combination thereof (preferably of formula 9a), wherein E has an average value of E has an average value of 10 to 100, preferably 20 to 80, or 30 to 70, more preferably 30 to 50 or 40 to 50. The second poly(carbonate-siloxane) copolymer can have a siloxane content greater than 30 wt. %, such as greater than 30 wt. % to 50 wt. %, preferably 35 wt. % to 45 wt. % or still more preferably about 40 wt. % or at least any one of, equal to any one of, or between any two of 30, 32, 35, 36, 37, 38, 39, 40, 41, 42, 43, 44, 45, 46, 47, 48, 49 and 50 wt. %, based on the total weight of the second poly (carbonate-siloxane) copolymer. In some aspects, the second poly(carbonate-siloxane) copolymer can have a Mw of 25,000 to 50,000 Da as measured by gel permeation chromatography using a crosslinked styrene-divinyl benzene column, at a sample concentration of 1 milligram per milliliter, and as calibrated with bisphenol A polycarbonate standards.

4. Impact Modifiers

The thermoplastic composition of the present invention can include one or more impact modifiers. Many impact modifiers are known and are commercially available. In some aspects, the impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of such impact modifiers can be used.

In some aspects, the impact modifier can be an elastomer-modified graft copolymer comprising (i) an elastomeric (i.e., rubbery) polymer substrate having a glass transition temperature (Tg) less than about 10° C., more specifically less than about −10° C., or more specifically about −40° to −80° C., and (ii) a rigid polymeric super state grafted to the elastomeric polymer substrate. Materials suitable for use as the elastomeric phase include, for example, conjugated diene rubbers, for example polybutadiene and polyisoprene; copolymers of a conjugated diene with less than about 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate. Non-limiting examples of the elastomer-modified graft copolymers include those formed from styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), and styrene-acrylonitrile (SAN).

Other impact modifiers include an epoxy-functional copolymer comprising units derived from a $C_2$-$C_{20}$ olefin and units derived from a glycidyl(meth)acrylate. Exemplary olefins include ethylene, propylene, butylene, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene.

In addition to glycidyl(meth)acrylate units, the copolymers can further comprise additional units, for example $C_1$-$C_4$ alkyl(meth)acrylate units. In one embodiment, the impact modifier is terpolymeric, comprising polyethylene blocks, methyl acrylate blocks, and glycidyl methacrylate blocks. Specific impact modifiers are a co- or ter-polymer including units of ethylene, glycidyl methacrylate (GMA), and methyl acrylate, available under the trade name LOTADER® polymer, sold by Arkema. The terpolymers comprise, based on the total weight of the copolymer, 0.3 to 12 wt. % of glycidyl methacrylate units, more specifically 0.4 to 11 wt. % of glycidyl methacrylate units, even more specifically 0.5 to 10 wt. % of glycidyl methacrylate units. Suitable impact modifiers include the ethylene-methyl acrylate-glycidyl methacrylate terpolymer comprising 8 wt. % glycidyl methacrylate units available under the trade name LOTADER AX8900.

In some particular aspects, the impact modifier can contain acrylonitrile-butadiene-styrene polymer (ABS), an acrylonitrile-styrene-butyl acrylate (ASA) polymer, a methyl methacrylate-acrylonitrile-butadiene-styrene (MABS) polymer, a methyl methacrylate-butadiene-styrene (MBS) polymer, and an acrylonitrile-ethylene-propylene-diene-styrene (AES) polymer, or a combination thereof. As used herein, ABS includes bulk polymerized ABS (BABS).

In some aspects, the impact modifier is a silicone graft copolymer. The silicone graft copolymer can be a silicon core-shell graft copolymer prepared by grafting ethylenically unsaturated monomers onto a rubbery silicone core, thus forming a rigid shell. Methods for preparing the silicone core-shell graft copolymers are known in the art. For example, silicone core-shell graft copolymers can be prepared by methods disclosed in U.S. Pat. No. 7,615,594, or in Abele et al., "Silicone Based Flame Retardant for Polycarbonate," *ANTEC,* 2009, pp. 1351-1354.

The ethylenically unsaturated monomers used to form the shell are generally a combination of a monofunctional monomer and a copolymerizable polyfunctional monomer. Examples of monofunctional monomers include styrene, α-methylstyrene, halogen or $C_{1-3}$ alkyl substituted styrene, acrylonitrile, methacrylonitrile, maleic acid, maleic anhydride, $C_1$-$C_4$alkyl and phenyl N-substituted maleimide, $C_1$-$C_8$alkyl methacrylates, $C_1$-$C_8$alkyl acrylates, and the like. Example of copolymerizable polyfunctional monomers include allyl methacrylate, triallyl cyanurate, triallyl isocyanurate, diallyl phthalate, ethylene glycol dimethacrylate, 1,3-butylene glycol dimethacrylate, divinyl benzene, and the like. Preferred monomers are the $C_1$-$C_8$alkyl methacrylates, $C_1$-$C_8$alkyl acrylates, for example, $C_1$-$C_6$ alkyl methacrylates.

The rubbery silicone core can be prepared by polymerization of a cyclosiloxane in the presence of a curing agent to produce particles. The particles can have an average diameter of 0.1 to 1 micrometer. Examples of cyclosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like.

Examples of curing agents include reactive silanes, for example trimethoxymethylsilane, tetramethoxysilane, tetraethoxysilane, and the like. The silicone core can comprise 20 to 100 wt % of silicone, or 30 to 95 wt % of silicone, with the remainder of the core being rubber groups.

The rubber content of the silicone-based core-shell graft copolymer can be in the range of 30 to 90% by weight. In some embodiments, the silicone core-shell graft copolymer comprises more than 70 wt %, or 60 to 80 wt %, or 60 to 70 wt %, or 65 to 75 wt % of the silicone core component, wherein the graft shell component is derived from primarily $C_1$-$C_6$ alkyl methacrylates.

In some aspects, the impact modifier can be a MBS polymer. In some aspects, the impact modifier can be MBS core-shell impact modifier. In some aspects, the impact modifier includes MBS containing impact modifiers available under trade name PARALOID EXL 2650 from Dow, KANE ACE M-731 from Kaneka, KANE ACE M-741 from Kaneka, and/or PARALOID EXL3691A from Rohm and Haas. In some aspect, the impact modifier can a silicon graft copolymer. In some aspect, the silicon graft copolymer can be a silicone-acrylic-based rubber impact modifier In some aspects, the silicone core-shell graft copolymer includes KANE ACE™ MR-01 from Kaneka Corporation (Japan), and/or METABLEN™ S-2001 by Mitsubishi Rayon Carbon Fiber and Composites.

5. Additives

The thermoplastic composition can contain one or more additives. The one or more additives may include, but are not limited to, fillers, reinforcing agents, sealant, toughening agent/dispersion agent, anti-oxidants, heat stabilizers, light stabilizers, ultraviolet light (UV) absorbers, plasticizers, lubricants, mold release agents, antistatic agents, colorants, blowing agents, melt strength additives, flame retardants, flame retardant synergists, quenchers, epoxy additive or anti-drips.

In some aspects, an additive package containing, pentaerythritol tetrastearate (PETS), pentaerythritol tetrakis-(3-dodecylthiopropionate) (SEENOX 412S), tetrakis(2,4-di-tert-butylphenyl) [1,1-biphenyl]-4,4'-diylbisphosphonite (PEPQ), monozinc phosphate (MZP), phosphoric acid, hydroxyl octaphenyl benzotriazole, a phosphite stabilizer (e.g., IRGAFOS 168), or a hindered phenol (e.g., IRGAFOS 1076), or any combination thereof, can be used.

Non-limiting examples of antioxidants include sterically hindered phenolic compounds, aromatic amines, a phosphite compound, carbon black and the like. Non-limiting examples of phenolic antioxidants include 2,6-di-tert-butyl-4-methylphenol (CAS No. 128-37-0), pentaerythritol-tetrakis(3-(3,5-di-tert-butyl-4-hydroxyphenyl) propionate (CAS No. 6683-19-8), octadecyl 3-(3',5'-di-tert-butyl-4-hydroxyphenyl) propionate (CAS No. 2082-79-3), 1,3,5-trimethyl-2,4,6-tris-(3,5-di-tert-butyl-4-hydroxybenzyl)benzene (CAS No. 1709-70-2), 2,2'-thiodiethylenebis(3,5-di-tert-butyl-4-hydroxyphenyl) propionate (CAS No. 41484-35-9), calcium bis(ethyl 3,5-di-tert-butyl-4-hydroxybenzylphosphonate) (CAS No. 65140-91-2), 1,3,5-tris(3',5'-di-tert-butyl-4'-hydroxybenzyl)-isocyanurate (CAS No. 27676-62-6), 1,3,5-tris(4-tert-butyl-3-hydroxy-2,6-dimethylbenzyl)-1,3,5-triazine-2,4,6-(1H,3H,5H)-trione (CAS No. 40601-76-1), 3,3-bis (3-tert-butyl-4-hydroxyphenyl)ethylene butyrate (CAS No. 32509-66-3), 4,4'-thiobis(2-tert-butyl-5-methylphenol) (CAS No. 96-69-5), 2,2'-methylene-bis-(6-(1-methyl-cyclohexyl)-para-cresol) (CAS No. 77-62-3), 3,3'-bis(3,5-di-tert-butyl-4-hydroxyphenyl)-N,N'-hexamethylenedipropionamide (CAS No. 23128-74-7), 2,5,7,8-tetramethyl-2-(4',8',12'-trimethyltridecyl)-chroman-6-ol (CAS No. 10191-41-0), 2,2-ethylidenebis(4,6-di-tert-butylphenol) (CAS No. 35958-30-6), 1,1,3-tris(2-methyl-4-hydroxy-5'-tert-butylphenyl) butane (CAS No. 1843 Mar. 4), 3,9-bis(1,1-dimethyl-2-(beta-(3-tert-butyl-4-hydroxy-5-methylphenyl) propionyloxy)ethyl)-2,4,8,10-tetraoxaspiro[5,5]undecane (CAS No. 90498-90-1), 1,6-hexanediyl-bis(3,5-bis(1,1-dimethylethyl)-4-hydroxybenzene) propanoate) (CAS No. 35074-77-2), 2,6-di-tert-butyl-4-nonylphenol (CAS No. 4306-88-1), 4,4'-butylidenebis(6-tert-butyl-3-methylphenol (CAS No. 85-60-9); 2,2'-methylene bis(6-tert-butyl-4-methylphenol) (CAS No. 119-47-1), triethylenglycol-bis-(3-tert-butyl-4-hydroxy-5-methylphenyl) propionate (CAS No. 36443-68-2), a mixture of $C_{13}$ to $C_{15}$ linear and branched alkyl esters of 3-(3',5'-di-tert-butyl-4'-hydroxyphenyl) propionic acid (CAS No. 171090-93-0), 2,2'-thiobis(6-tert-butyl-para-cresol) (CAS No. 90-66-4), diethyl-(3,5-di-tert-butyl-4-hydroxybenzyl)phosphate (CAS No. 976-56-7), 4,6-bis(octylthiomethyl)-ortho-cresol (CAS No. 110553-27-0), benzenepropanoic acid, octyl 3-(3,5-di-tert-butyl-4-hydroxyphenyl) propanoate (CAS No. 125643-61-0), 1,1,3-tris [2-methyl-4-[3-(3,5-di-tert-butyl-4-hydroxyphenyl) propionyloxy]-5-tert-butylphenyl]butane (CAS No. 180002-86-2), mixed styrenated phenols (CAS No. 61788-44-1), butylated, octylated phenols (CAS No. 68610-06-0), pentaerythritol tetrakis-(3-dodecylthiopropionate) and butylated reaction product of p-cresol and dicyclopentadiene (CAS No. 68610-51-5). In some aspects, the thermoplastic composition can include 0.005 to 0.1 wt. %, of an antioxidant such as a sterically hindered phenolic compound e.g. pentaerythritol-tetrakis(3-(3,5-di-tert-butyl-4-hydroxyphenyl) propionate.

There is considerable overlap among plasticizers, lubricants, and mold release agents, which include, for example phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like, phosphates such as Bisphenol A bis(diphenyl phosphate) (BPADP), resorcinol bis(diphenyl phosphate) (RDP), and SOLDP (a proprietary oligomeric phosphate additive supplied by ICL Industrial Products). Non-limiting examples of a lubricant such as mold release agent include glycerol monostearate, pentaerythritol tetrastearate, or a combination that includes at least one of the foregoing, preferably wherein the mold release agent is glycerol monostearate. In some aspects, the thermoplastic composition can include 0.01 to 1 wt. % of a mold release agent such as pentaerythritol tetrastearate.

Colorant can include inorganic pigment (e.g. $TiO_2$, carbon black) or organic dyes or a combination thereof. Non-limiting examples of organic dyes include Solvent Blue 97, Solvent Violet 36, Solvent Red 135, and/or Solvent Green 3.

In some aspects, the toughening agent/dispersion agent can contain a poly(ethylene-vinyl acetate). Poly(ethylene-vinyl acetate) is a random copolymer of ethylene and vinyl acetate. In some aspects, the vinyl acetate content of the poly(ethylene-vinyl acetate) is 1 to 20 wt. %, preferably 5 to 15 wt. %, with the balance being ethylene content. In some aspects, the thermoplastic composition can include 0.1 to 5 wt. %, 0.1 to 2 wt. %, or 0.5 to 1.5 wt. %, or 0.01 to 2 wt. % of a toughening agent/dispersion agent such as EVA polymer.

In some aspects, the quencher can be a metal containing quencher. In some aspects, the quencher can be zinc phosphate such as mono zinc phosphate (MZP). In some aspects, the thermoplastic composition can include 0.01 to 1 wt. % of aquencher such as MZP.

In some aspects, the anti-drip can be polytetrafluoroethylene (PTFE) containing anti-drip. In some aspects, the anti-drip can be PTFE and/or PTFE derivative totally or partially encapsulated by polymers or copolymers selected from polystyrene, poly-α-alkylstyrene, polyalkyl acrylates, polyalkyl methacrylates, vinyl polymers, polybutadienes, styrene-acrylonitrile (SAN) copolymers, copolymers of α-alkylstyrene-acrylonitrile, acrylonitrile-butadiene-styrene (ABS) copolymers, styrene-butadiene rubbers (SBR), and their mixtures. In some particular aspects, the anti-drip can be PTFE and/or PTFE derivative totally or partially encapsulated by polymers or copolymers selected from polystyrene, poly-α-methylstyrene, polymethyl methacrylate, polypropyl methacrylate, polybutyl methacrylate, polymethyl acrylate, polypropyl acrylate, polybutyl acrylate, polyvinyl chloride, polyvinylidene chloride, polyvinyl acetate, polyvinyl alcohols, polyvinylbutyraldehyde, styrene-acrylonitrile copolymers, α-methylstyrene-acrylonitrile copolymers, acrylonitrile-butadiene-styrene copolymers, and their mixture. In some particular aspects, the anti-drip can be polytetrafluoroethylene (PTFE) encapsulated by SAN, known as TSAN. TSAN comprises 50 wt. % PTFE and 50 wt. % SAN, based on the total weight of the encapsulated fluoropolymer. The SAN can comprise, for example, 75 wt % styrene and 25 wt % acrylonitrile based on the total weight of the copolymer. In some aspects, the thermoplastic composition can include 0.01 to 1 wt. % of the anti-drip such as TSAN.

In some aspects, the thermoplastic compositions can also contain an epoxy additive. Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like). Specific commercially available exemplary epoxy functionalized stabilizers include Cycloaliphatic Epoxide Resin ERL-4221 supplied by Union Carbide Corporation (a subsidiary of Dow Chemical), Danbury, CT; and epoxy modified acrylates such as JONCRYL ADR-4300 and JONCRYL ADR-4368, available from Johnson Polymer Inc., Sturtevant, WI. Epoxy additives can be used in amounts of up to 1 wt %, preferably 0.001 to 1 wt %, more preferably 0.001 to 0.5 wt %, based on the total weight of the thermoplastic composition. In an aspect, the epoxy additive can be included in an amount of 0.001 to 0.3 wt %, preferably 0.01 to 0.3 wt %, and more preferably 0.1 to 0.3 wt %, based on the total weight of the thermoplastic compositions. Use of greater amounts of epoxy compound can cause more splay, i.e., mold lines which fan outward from the point of injection into the mold, and observable to the unaided eye in molded articles comprising the thermoplastic composition.

B. Methods for Making the Thermoplastic Compositions

The thermoplastic compositions of the present invention can be made by various methods known in the art such as extrusion, injection molding, rotational molding, 3D printing, additive manufacturing and/or thermoforming or like. For example the components, such as the semicrystalline polyester, halogenated polycarbonate, first poly(carbonate-siloxane) copolymer, second poly(carbonate-siloxane) copolymer, antimony oxide, impact modifier, and one or more additives, can be mixed together and then melt-blended to form the thermoplastic composition. The melt blending of the components can include use of shear force, extensional force, compressive force, ultrasonic energy, electromagnetic energy, thermal energy or combinations comprising at least one of the foregoing forces or forms of energy.

In some aspects, the one or any foregoing components described herein may be first blended such as dry blended with each other such as by hand mixing or in a high-speed mixer. The blend is then fed into the throat of a twin-screw extruder via a hopper. In some aspects, at least one of the components can be incorporated into the composition by feeding it directly into the extruder at the throat and/or downstream through a side stuffer, or by being compounded into a master batch with a desired polymer and fed into the extruder. The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing. The extruder can generally be operated at a temperature higher than that necessary to cause the composition to melt and flow. In some aspects, the temperature of the melt in the extruder barrel can be maintained as low as possible in order to avoid excessive thermal degradation of the components. The melted composition exits extruder through small exit holes in a die. The extrudate can be quenched in a water bath and pelletized. The pellets so prepared can be of any desired length (e.g., one-fourth inch long or less). Such pellets can be used for subsequent molding, shaping, or forming.

Mixtures including any combination of the foregoing mentioned components may be subjected to multiple blending and forming steps if desirable. For example, the thermoplastic composition may first be extruded and formed into pellets. The pellets may then be fed into a molding machine where it may be formed into any desirable shape or product. In some aspects, the thermoplastic composition emanating from a single melt blender may be formed into sheets or strands and subjected to post-extrusion processes such as annealing, uniaxial or biaxial orientation.

Shaped, formed, casted, or molded articles comprising the thermoplastic compositions are also provided. The thermoplastic compositions can be molded into useful shaped articles by a variety of methods, such as injection molding, extrusion, rotational molding, blow molding, 3D printing, additive manufacturing and thermoforming. The article can be a molded article, a thermoformed article, an extruded film, an extruded sheet, a honeycomb structure, one or more layers of a multi-layer article, a substrate for a coated article, and a substrate for a metallized article.

C. Articles of Manufacture

The thermoplastic composition of the present invention can be comprised in an article of manufacture. Aspects of the disclosure also relate to articles including the thermoplastic composition described herein. In some aspects the article is a film, a sheet, a molded article, a welded article, a filament or a powder. In some aspects, the article can be a molded article, a thermoformed article, an extruded film, an extruded sheet, a honeycomb structure, one or more layers of a multi-layer article, a substrate for a coated article, and a substrate for a metallized article.

The article can be a consumer product. In some aspects, the article can be a medical device, hospital appliance or hospital appliance part, hospital instrument or hospital instrument part, hospital building part, hospital furniture or hospital furniture part. In some aspects, the article can be a healthcare product.

In some aspects, the health care product can be an A-V shunt, a balloon, a balloon pump, a biosensor, a blood filter housing, a blood pump, a cannula, a catheter, a defibrillator lead, a dialyzer, a disc, an extra-corporeal device, a filter, a food tray, a guidewire, a hygienic barrier, defibrillator, drug delivery pump, diagnostic recorder, cochlear implant, drug delivery device, glucose monitor, or neurostimulator, an in-dwelling access device or port, an intravenous connector, a ligature, a medical appliance, a medical equipment housing, a medical storage tray, a medical tubing, a membrane such as a membrane for filtration or cell encapsulation, a monitor housing, a pacemaker lead, a plate, a scaffolding, a shunt, a stent, a support, a transfusion joint, a valve, an intravenous connector, or an animal cage.

In some aspects, the article can be a cable sheathing, a structural component for pumps and vehicles, a door handle/knob, a mining ore screen, a mining conveyor belt, an aeronautical component, a chocolate mold, furniture, well lock, a watercooker component, a washer component, a dishwasher component, a dishwasher safe article, cards, credit cards, a component of a consumer electronic device such as a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, a loudspeaker, an electronic housing for an adapter, a cell phone, a smart phone, a GPS device, a laptop computer, a tablet computer, an e-reader, a copier, a solar apparatus, or an automotive, scooter, or motorcycle exterior or interior component, and can be, for example, a panel, a quarter panel, a rocker panel, a trim, a fender, a battery cover, a door, a deck-lid, a trunk lid, a hood, a bonnet, a roof, a bumper, a fascia, a grille, a mirror housing, a pillar applique, a cladding, a body side molding, a wheel cover, a hubcap, a door handle, a spoiler, a window frame, a headlamp bezel, a headlamp, a tail lamp, a tail lamp housing, a tail lamp bezel, a license plate enclosure, a roof rack, a running board, automotive part, automotive part under the hood, construction appliance, electronic device, electrical device, electronic displays, fluid handling device, household goods, industrial appliance, lawn and garden equipment, lighting device, oil and gas industry device, or an outdoor appliance In the context of the present invention, at least the following 15 aspects are described. Aspect 1 is directed to a thermoplastic composition containing 30 wt. % to 70 wt. % of a semi-crystalline polyester, 10 wt. % to 50 wt. % of a halogenated polycarbonate, 3 wt. % to 25 wt. % of a first poly(carbonate-siloxane) copolymer having a siloxane content of less than 30 wt. %, wherein the siloxane content is based on the total weight of the first poly(carbonate-siloxane) copolymer, and 3 wt. % to 25 wt. % of a second poly(carbonate-siloxane) copolymer having a siloxane content of greater than 30 wt. %, wherein the siloxane content is based on the total weight of the second poly(carbonate-siloxane) copolymer, wherein the composition has a UL94 rating of V0 at a thickness of 1.5 mm, and wherein an ASTM tensile bar comprising the composition has a tensile strength retention of 80% and higher after exposure of the bar for 168 hours to SANI-CLOTH AF3 at a temperature of 23° C. under 0.5% or 1% strain compared to a non-exposed reference tested at the same temperature, and a tensile elongation retention of 65% and higher after exposure of the bar for 168 hours to SANI-CLOTH AF3 at a temperature of 23° C. under 0.5% or 1% strain compared to a non-exposed reference tested at the same temperature. Aspect 2 is directed to the thermoplastic composition of aspect 1, wherein the semicrystalline polyester is polybutylene terephthalate (PBT) and/or polyethylene terephthalate (PET), preferably PBT. Aspect 3 is directed to the thermoplastic composition of aspect 1 or 2, wherein the halogenated polycarbonate is a brominated polycarbonate. Aspect 4 is directed to the thermoplastic composition of any one of aspects 1 to 3, wherein the first poly(carbonate-siloxane) copolymer has a siloxane content of 3 to 25 wt. %, based on the total weight of the first poly(carbonate-siloxane) copolymer. Aspect 5 is directed to the thermoplastic composition of any one of aspects 1 to 4, wherein the second poly(carbonate-siloxane) copolymer has a siloxane content of 35 to 45 wt. %, based on the total weight of the second poly(carbonate-siloxane)

copolymer. Aspect 6 is directed to the thermoplastic composition of any one of aspects 1 to 5, containing 40 wt. % to 60 wt. % of PBT, 15 wt. % to 25 wt. % of the halogenated polycarbonate, wherein the halogenated polycarbonate is a brominated polycarbonate, 5 wt. % to 15 wt. % of the first poly(carbonate-siloxane) copolymer having a siloxane content of 3 wt. % to 10 wt. %, wherein the siloxane content is based on the total weight of the first poly(carbonate-siloxane) copolymer, and 5 wt. % to 15 wt. % of the second poly(carbonate-siloxane) copolymer having a siloxane content of 35 wt. % to 45 wt. %, wherein the siloxane content is based on the total weight of the second poly(carbonate-siloxane) copolymer. Aspect 7 is directed to the thermoplastic composition of any one of aspects 1 to 6, further comprising an antimony oxide and/or an impact modifier. Aspect 8 is directed to the thermoplastic composition of aspect 7, comprising 1 wt. % to 10 wt. % of the antimony oxide and 5 wt. % to 20 wt. % of the impact modifier. Aspect 9 is directed to the thermoplastic composition of any one of aspects 1 to 8, further comprising one or more additives selected from fillers, reinforcing agents, toughening agent/dispersion agent, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents. Aspect 10 is directed to the thermoplastic composition of any one of aspects 1 to 9, comprising at least one of, any combination of, or all of the following properties: a melt volume rate (MVR) of greater than 5 cc/10 min, preferably 9 cc/10 min to 12 cc/10 min as measured at 250° C., 5 kg, 360 sec, in accordance with ASTM D1238; a Vicat softening point higher than 110° C., preferably 112° C. to 145° C., at 50 N load, rate 120° C./h, as measured in accordance with ASTM D1525; a notched Izod impact strength greater than 350 J/m, preferably 450 J/m to 700 J/m at 23° C., 5.5 Joules pendulum energy as measured in accordance with ASTM D256; a tensile modulus greater than 1800 MPa, preferably 1900 MPa to 2200 MPa at 23° C., 50 mm/min, as measured in accordance with ASTM D638; an elongation at break greater than 35% at 23° C., as measured in accordance with D638; and/or a ductility of at least 80%, preferably 80% to 100% at 23° C. under multi-axial impact strength test conditions per ASTM D3763. Aspect 11 is directed to the thermoplastic composition of any one of aspects 1 to 10, wherein the ASTM tensile bar comprising the composition has higher tensile strength retention and higher tensile elongation retention after exposure of the bar for 168 hours to SANI-CLOTH AF3 at a temperature of 23° C. under 0.5% or 1% strain compared to a reference ASTM tensile bar comprising a reference composition not containing the second poly(carbonate-siloxane) copolymer. Aspect 12 is directed to the thermoplastic composition of any one of aspects 1 to 11, wherein the composition is an extruded, a blow-molded, an injection-molded, rotational molded and/or thermoformed thermoplastic composition. Aspect 13 is directed to the thermoplastic composition of any one of aspects 1 to 12, wherein the composition is comprised in an article of manufacture. Aspect 14 is directed to the thermoplastic composition of aspect 13, wherein the article of manufacture is a medical device, hospital appliance or hospital appliance part, hospital instrument or hospital instrument part, hospital building part, hospital furniture or hospital furniture part. Aspect 15 is directed to the thermoplastic composition of any one of aspects 13 to 14, wherein the article of manufacture is a healthcare product such as a transfusion joint, a monitor housing, a blood filter housing, an intravenous connector, a dialyzer, a catheter, a medical storage tray, a medical appliance, a medical tubing, a cannula, an extra-corporeal device, a pacemaker lead, a defibrillator lead, a blood pump, a balloon pump, a A-V shunt, a biosensor, a membrane for cell encapsulation, a food tray, an animal cage, a cable sheathing, a structural component for pumps and vehicles, a mining ore screen, a mining conveyor belt, an aeronautical component, a chocolate mold, a watercooker component, a washer component, a dishwasher component, a or dishwasher safe article.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Chemically Resistant Flame Retardant Thermoplastic Composition

The materials used in the Example 1 are described in Table 1. Thermoplastic compositions were prepared with concentrations as shown in tables 2 and 3. The raw materials were pre-blended and extruded using a twin screw extruder with the temperature profile 350-425-450-475-500-520° F. Properties of the respective compositions are listed in tables 2 and 3. Description of the components

TABLE 1

| Components | | |
|---|---|---|
| Component | Chemical Description | Source |
| PBT-1 | Poly(butylene terephthalate) having an intrinsic viscosity of 1.2 dl/g as measured in 1:1 weight to weight mixture of phenol: 1,1,2,2-tetrachloro ethane at 30° C. | SABIC |
| PBT-2 | Poly(butylene terephthalate) having an intrinsic viscosity of 0.70 dl/g as measured in 1:1 weight to weight mixture of phenol: 1,1,2,2-tetrachloro ethane at 30° C. | SABIC |
| PC-Siloxane, Siloxane content 20%, | PDMS (polydimethylsiloxane)-Bisphenol A Polycarbonate copolymer, 20 wt % siloxane, average PDMS block length of 45 units (D45), Mw 30,000 Da as determined by GPC using bisphenol A polycarbonate standards, p-cumylphenol (PCP) end-capped | SABIC |
| PC-Siloxane, Siloxane content 6% | PDMS (polydimethylsiloxane)-Bisphenol A Polycarbonate copolymer, 6 wt % siloxane, average PDMS block length of 45 units (D45), Mw 23,000 Da as determined by GPC using bisphenol A polycarbonate standards, para-cumylphenol (PCP) end-capped | SABIC |
| PC-Siloxane, Siloxane content 40% | PC-Siloxane, Siloxane content 40% | SABIC |
| Br-PC | Brominated Bisphenol A Polycarbonate, Mw = 23,000-25,000 Da, 26 wt. % Br. | SABIC |

TABLE 1-continued

| Components | | |
|---|---|---|
| Component | Chemical Description | Source |
| Impact Modifier (IM)-1 | Methyl methacrylate-butadiene-styrene copolymer | |
| IM-2 | Metablen S 2001 | |
| Antimony oxide | $Sb_2O_3$ >99.8% | |
| Ethylene vinyl acetate (EVA) | Poly(ethylene-vinyl acetate) with vinyl acetate content of 9 wt. % | VERSALIS |
| Hindered phenol stabilizer | Pentaerythritol tetrakis(3-(3,5-di-tert-buty1-4-hydroxyphenyl)propionate | AKROCHEM |
| PETS | Pentaerythritol tetrastearate | |
| Mono zinc phosphate | Phosphoric acid, zinc salt (2:1) | |
| Styrene-acrylonitrile (SAN)/ polytetrafluoro ethylene (PTFE) | SAN encapsulated PTFE | SABIC |
| 100 Grade PC | Linear Bisphenol A polycarbonate, p-cumylphenol end-capped, having a weight average molecular weight of about 29,900 grams/mole and a polydispersity index around 2.5 as determined by gel permeation chromatography using polycarbonate standards | SABIC |
| PET High IV | Polyethylene terephthalate with CAS # 25038-59-9 Intrinsic Viscosity: 0.84 dl/g | DAK |

TABLE 2

| Compositions | | | | | | |
|---|---|---|---|---|---|---|
| | Unit | C-1 | C-2 | C-3 Inventive (Inv) | C-4 (Inv) | C-5 |
| Components | | | | | | |
| PBT-1 | % | 41.91 | 41.91 | 39.34 | 39.34 | 29.66 |
| PBT-2 | % | 7.75 | 7.75 | | | |
| PC-Siloxane, Siloxane content 6 % | % | | | 8 | 8 | |
| Br-PC | % | 20 | 24 | 30 | 30 | 30 |
| 100 GRADE PCP | % | | | | | 14 |
| PC-Siloxane, Siloxane content 40% | % | 12 | 12 | 8.32 | 8.32 | 12 |
| IM-1 | % | 12 | 8 | 8 | | 8 |
| IM-2 | % | | | | 8 | |
| Antimony oxide | % | 4.98 | 4.98 | 4.98 | 4.98 | 4.98 |
| Ethylene vinyl acetate | % | 0.8 | 0.8 | 0.8 | 0.8 | 0.8 |
| SAN/PTFE | % | 0.1 | 0.1 | 0.1 | 0.1 | 0.1 |
| Pentaerythritol tetrastearate | % | 0.3 | 0.3 | 0.3 | 0.3 | 0.3 |
| Mono zinc phosphate | % | 0.1 | 0.1 | 0.1 | 0.1 | 0.1 |
| Hindered phenol stabilizer | % | 0.06 | 0.06 | 0.06 | 0.06 | 0.06 |
| Formulation Total | | 100 | 100 | 100 | 100 | 100 |
| Properties | | | | | | |
| MVR (250 C/5 Kg)-360 s | cc/10 min | 7.88 | 8.3 | 6.63 | 5.98 | 4.83 |
| MVR (250 C/5 Kg)-1080 s | cc/10 min | 9.87 | 9.89 | 8.36 | 9.81 | 6.31 |
| Vicat (load of 50N, rate of 120° C./h; ASTM D1525) | ° C. | 106 | 122 | 140 | 140 | 132.7 |
| Std. Dev. | | 0.778 | 0.212 | 0.212 | 1.56 | 0.14 |
| Tensile Modulus (23° C., 50 mm/min, ASTM D638) | MPa | 1652 | 1776 | 1888 | 1832 | 1870 |
| Std. Dev. | | 10.954 | 8.944 | 10.954 | 8.367 | 15.811 |
| Tensile Strength at Break (23° C., 50 mm/min, ASTM D638) | MPa | 32.4 | 34.8 | 38 | 38.5 | 41.4 |
| Std. Dev. | | 0.492 | 0.158 | 0.92 | 1.05 | 0.792 |
| Tensile Strength at Yield (23° C., 50 mm/min, ASTM D638) | MPa | 38.4 | 42.5 | 45.8 | 44.7 | 48.4 |
| Std. Dev. | | 0.0548 | 0.0447 | 0.0447 | 0.0548 | 0.0837 |
| Elongation at Break (23° C., 50 mm/min, ASTM D638) | % | 43.45 | 52.81 | 57.02 | 49.34 | 129.21 |

TABLE 2-continued

| | Unit | C-1 | C-2 | C-3 Inventive (Inv) | C-4 (Inv) | C-5 |
|---|---|---|---|---|---|---|
| Compositions | | | | | | |
| Std. Dev. | | 2.63 | 7.59 | 13.73 | 8.38 | 1.52 |
| Izod impact strength, notched (23° C., 5.5 Joules pendulum energy, ASTM D256) | J/m | 183 | 144 | 588 | 398 | 554 |
| Std. Dev. | | 84.3 | 13.6 | 7.24 | 104 | 37.2 |
| % Ductility | | 40 | 25 | 100 | 80 | 100 |
| % PBT and/or PET | | 49.7 | 49.7 | 39.3 | 39.3 | 29.7 |
| Total Flame Time (23 C/48 Hr) | s | 111 | 18 | 10 | 9 | 10 |
| Total Flame Time (70 C/168 Hr) | s | Not tested | 14 | 7 | 5 | 6 |
| UL 94 Rating, 1.5 mm | | Not tested | V-0 | V-0 | V-0 | V-0 |
| % Retention Tensile Str at Yield 3 days | | 96.35 | 97.18 | 96.72 | 95.53 | 96.07 |
| % Retention Elong at Break 3 days | | 104.67 | 124.98 | 105.45 | 128.25 | 65.84 |

As can be seen from table-2, compositions C-1 and C-2 don't contain a PC-siloxane with 6% siloxane, and have low notched Izod impact strength. As can be seen from total flame time values, composition C-1 also failed the UL test and does not have good flame retardant properties. Composition C-5 has low semi-crystalline polyester content, below 30 wt. %, and has low chemical resistance against SANI-CLOTH AF3. C-5 has low, less than 70%, retention of tensile elongation at break. As can be seen from total flame time values and % retention elongation at break values, inventive compositions, C-3 and C-4 have good flame retardant properties and good chemical resistance. The % retention of tensile elongation at break values in table 2 were measured in accordance with ASTM D638 Type I method at 50 mm/min after exposure to SANI-CLOTH AF3 for 3 days under 1% strain at 23° C. ASTM tensile bars are mounted on 1% strain jigs and wrapped with SANI-CLOTH AF3 wipe. The jig is then wrapped in Al foil to prevent the wipes from drying. Samples are removed from jigs after 3 days and tested for tensile properties.

TABLE 3

| Components | Unit | C-6 (Inv) | C-7 (Inv) | C-8 |
|---|---|---|---|---|
| Compositions | | | | |
| PBT-1 | % | 29.54 | 26.57 | 26.57 |
| PBT-2 | % | 10 | 8.8 | 8.8 |
| PC-Siloxane, Siloxane content 6% | % | 8 | 8 | 8.32 |
| PC-Siloxane, Siloxane content 20%, | % | | | 8 |
| Br-PC | % | 30 | 24 | 24 |
| PET HIGH IV | % | | 10 | 10 |
| PC-Siloxane, Siloxane content 40% | % | 8.32 | 8.32 | |
| Impact Modifier-1 | % | 8 | 8 | 8 |
| Antimony oxide | % | 4.98 | 4.75 | 4.75 |
| Ethylene vinyl acetate | % | 0.8 | 0.8 | 0.8 |
| SAN encapsulated PTFE-intermediate resin | % | 0.1 | 0.5 | 0.5 |

TABLE 3-continued

| | | | | |
|---|---|---|---|---|
| Pentaerythritol tetrastearate | % | 0.1 | 0.1 | 0.1 |
| Mono zinc phosphate | % | 0.1 | 0.1 | 0.1 |
| Hindered phenol stabilizer | % | 0.06 | 0.06 | 0.06 |
| Formulation Total | | 100 | 100 | 100 |
| Properties | | | | |
| MVR (250 C/5 Kg)-360 s | cc/10 min | 7.57 | 5.37 | 6.77 |
| MVR (250 C/5 Kg)-1080 s | cc/10 min | 8.02 | 6.21 | 7.71 |
| Vicat (load of 50N, rate of 120° C./h; ASTM D1525) | ° C. | 128 | 112 | 104 |
| Std. Dev. | | 1.18 | 1.41 | 2.07 |
| Tensile Modulus (23° C., 50 mm/min, ASTM D638) | MPa | 1916 | 1976 | 2096 |
| Std. Dev. | | 11.402 | 11.402 | 16.733 |
| Tensile Strength at Break (23° C., 50 mm/min, ASTM D638) | MPa | 36.3 | 37.4 | 39 |
| Std. Dev. | | 0.737 | 0.913 | 0.526 |
| Tensile Strength at Yield (23° C., 50 mm/min, ASTM D638) | MPa | 47.3 | 45 | 46.8 |
| Std. Dev. | | 0.141 | 0.158 | 0.148 |
| Elongation at Break (23° C., 50 mm/min, ASTM D638) | % | 36.08 | 113.55 | 117.03 |
| Std. Dev. | | 6.45 | 34.72 | 24.19 |
| Izod impact strength, notched (23° C., 5.5 Joules pendulum energy, ASTM D256) | J/m | 457 | 365 | 443 |
| Std. Dev. | | 142 | 172 | 265 |
| % Ductility | | 80 | 40 | 60 |
| MAI Energy, Total (23° C., 3.3 m/s) | J | 55 | 54.7 | 57 |
| Std. Dev. | | 3.91 | 1.96 | 1.72 |
| % Ductility | | 100 | 100 | 100 |
| % PBT and/or PET | | 39.54 | 45.37 | 45.37 |
| Total Flame Time (23° C./48 Hr) | s | 9 | 9 | 6 |
| Total Flame Time (70° C./168 Hr) | s | 10 | 11 | 8 |
| UL 94 Rating 1.5 mm | | V-0 | V-0 | V-0 |
| % Retention Tensile Str at Yield-3d | | 96.4 | 97.3 | 97.2 |

TABLE 3-continued

| | | | | |
|---|---|---|---|---|
| % Retention Elong at Break-3d | | 123.3 | 81.6 | 55.1 |
| % Retention Tensile Str at Yield-7d | | 95.1 | 95.8 | 95.7 |
| % Retention Elong at Break-7d | | 105.1 | 103.7 | 84.8 |
| Compositions | | | | |
| Components | Unit | C-9 (Inv) | C-10 | C-11 (Inv) |
| PBT-1 | % | 34.57 | 30 | 35 |
| PBT-2 | % | 11.2 | 8 | 14.37 |
| PC-Siloxane, Siloxane content 6% | % | 8 | 11.96 | 8 |
| PC-Siloxane, Siloxane content 20%, PCP endcapped | % | | 5.5 | |
| Br-PC | % | 24 | 20 | 20 |
| PET HIGH IV | % | | 10 | |
| PC-Siloxane, Siloxane content 40% | % | 8.32 | | 8.32 |
| IM-1 | % | 8 | 8 | 8 |
| Antimony oxide | % | 4.75 | 4.98 | 4.75 |
| Ethylene vinyl acetate | % | 0.8 | 0.8 | 0.8 |
| SAN encapsulated PTFE-intermediate resin | % | 0.1 | 0.5 | 0.5 |
| Pentaerythritol tetrastearate | % | 0.1 | 0.1 | 0.1 |
| Mono zinc phosphate | % | 0.1 | 0.1 | 0.1 |
| Hindered phenol stabilizer | % | 0.06 | 0.06 | 0.06 |
| Formulation Total | | 100 | 100 | 100 |
| Properties | | | | |
| MVR (250 C/5 Kg)-360 s | cc/10 min | 9.15 | 7.14 | 10.6 |
| MVR (250 C/5 Kg)-1080 s | cc/10 min | 9.74 | 7.69 | 10.4 |
| Vicat (load of 50N, rate of 120° C./h; ASTM D1525) | ° C. | 127 | 130 | 121 |
| Std. Dev. | | 4 | 0.566 | 4.06 |
| Tensile Modulus(23° C., 50 mm/min, ASTM D638) | MPa | 1912 | 2096 | 1928 |
| Std. Dev. | | 13.038 | 13.416 | 8.367 |
| Tensile Strength at Break (23° C., 50 mm/min, ASTM D638) | MPa | 35.3 | 38.1 | 37 |
| Std. Dev. | | 0.517 | 1.65 | 0.114 |
| Tensile Strength at Yield (23° C., 50 mm/min, ASTM D638) | MPa | 45 | 47.9 | 43.6 |
| Std. Dev. | | 0.0837 | 0.0837 | 0.0837 |
| Elongation at Break (23° C., 50 mm/min, ASTM D638) | % | 61.03 | 97.85 | 88.97 |
| Std. Dev. | | 4.08 | 33.81 | 15.54 |
| Izod impact strength, notched (23° C., 5.5 Joules pendulum energy, ASTM D256) | J/m | 602 | 715 | 511 |
| Std. Dev. | | 13.5 | 15.8 | 189 |
| % Ductility | | 100 | 100 | 80 |
| MAI Energy, Total (23° C., 3.3 m/s) | J | 56.2 | 58.8 | 54.6 |
| Std. Dev. | | 2.08 | 2.12 | 0.853 |
| % Ductility | | 100 | 100 | 100 |
| % PBT and/or PET | | 45.77 | 48 | 49.37 |
| Total Flame Time (23° C./48 Hr) | s | 16 | 15 | 14 |
| Total Flame Time (70° C./168 Hr) | s | 16 | 14 | 12 |
| UL 94 Rating 1.5 mm | | V-0 | V-0 | V-0 |
| Total Flame Time (23° C./48 Hr) | s | | | 21 |
| Total Flame Time (70° C./168 Hr) | s | | | 33 |
| UL 94 Rating 0.75 mm | | | | V-0 |
| % Retention Tensile Str at Yield-3d | | 96.2 | 97.1 | 97.0 |
| % Retention Elong at Break-3d | | 86.1 | 77.5 | 91.2 |
| % Retention Tensile Str at Yield-7d | | 95.3 | 96.2 | 95.4 |
| % Retention Elong at Break-7d | | 72.5 | 59.6 | 87.5 |

As can be seen from table 3, compositions C-8 and C-10 don't contain PC-Siloxane with 40% siloxane and have low chemical resistance. C-8 and C-10 both have less than 80% 3 day retention of tensile elongation at break. Inventive composition C-11 have good balance of flow, mechanical properties, flame retardant properties and chemical resistance. The % retention of tensile elongation at break values in table 3 were measured in accordance with ASTM D638 Type I method at 50 mm/min after exposure to SANI-CLOTH AF3 for 3 days or 7 days under 1% strain at 23° C. ASTM tensile bars are mounted on 1% strain jigs and wrapped with SANI-CLOTH AF3 wipe. The jig is then wrapped in Al foil to prevent the wipes from drying. Samples are removed from jigs after 3 days or 7 days and tested for tensile properties.

The invention claimed is:

1. A thermoplastic composition comprising:
30 wt. % to 70 wt. % of a semi-crystalline polyester;
10 wt. % to 50 wt. % of a halogenated polycarbonate;
3 wt. % to 25 wt. % of a first poly(carbonate-siloxane) copolymer having a siloxane content of 3 wt. % to 25 wt. %, wherein the siloxane content is based on the total weight of the first poly(carbonate-siloxane) copolymer; and
3 wt. % to 25 wt. % of a second poly(carbonate-siloxane) copolymer having a siloxane content of greater than 30 wt. %, wherein the siloxane content is based on the total weight of the second poly(carbonate-siloxane) copolymer,
wherein the composition has a UL94 rating of V0 at a thickness of 1.5 mm, and
wherein an ASTM tensile bar comprising the composition has a tensile strength retention of at least 80% after exposure of the bar for 168 hours to SANI-CLOTH AF3 at a temperature of 23° C. under 0.5% or 1% strain compared to a non-exposed reference tested at the same condition, and a tensile elongation retention of at least 65% after exposure of the bar for 168 hours to SANI-CLOTH AF3 at a temperature of 23° C. under 0.5% or 1% strain compared to a non-exposed reference tested at the same condition.

2. The thermoplastic composition of claim 1, wherein the semicrystalline polyester is polybutylene terephthalate (PBT) and/or polyethylene terephthalate (PET).

3. The thermoplastic composition of claim 1, wherein the halogenated polycarbonate is a brominated polycarbonate.

4. The thermoplastic composition of claim 1, wherein the second poly(carbonate-siloxane) copolymer has a siloxane content of 35 to 45 wt. %, based on the total weight of the second poly(carbonate-siloxane) copolymer.

5. The thermoplastic composition of claim 1, comprising:
40 wt. % to 60 wt. % of PBT;
15 wt. % to 25 wt. % of the halogenated polycarbonate, wherein the halogenated polycarbonate is a brominated polycarbonate;
5 wt. % to 15 wt. % of the first poly(carbonate-siloxane) copolymer having a siloxane content of 3 wt. % to 10 wt. %, wherein the siloxane content is based on the total weight of the first poly(carbonate-siloxane) copolymer; and 5 wt. % to 15 wt. % of the second poly(carbonate-siloxane) copolymer having a siloxane content of 35 wt. % to 45 wt. %, wherein the siloxane content is based on the total weight of the second poly(carbonate-siloxane) copolymer.

6. The thermoplastic composition of claim 1, further comprising an antimony oxide and/or an impact modifier.

7. The thermoplastic composition of claim 6, comprising 1 wt. % to 10 wt. % of the antimony oxide and 5 wt. % to 20 wt. % of the impact modifier.

8. The thermoplastic composition of claim 1, further comprising one or more additives selected from fillers, reinforcing agents, toughening agent/dispersion agent, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents.

9. The thermoplastic composition of claim 1, comprising at least one of, any combination of, or all of the following properties:

a melt volume rate (MVR) of greater than 5 cc/10 min, as measured at 250° C., 5 kg, 360 sec, in accordance with ASTM D1238;

a Vicat softening point higher than 110° C., as measured in accordance with ASTM D1525;

a notched Izod impact strength greater than 350 J/m at 23° C., as measured in accordance with ASTM D256;

a tensile modulus greater than 1800 MPa at 23° C., as measured in accordance with ASTM D638;

an elongation at break greater than 35% at 23° C., as measured in accordance with D638; and/or a ductility of at least 80% at 23° C. under multiaxial impact strength test conditions per ASTM D3763.

10. The thermoplastic composition of claim 1, wherein the ASTM tensile bar comprising the composition has a tensile strength retention of at least 90% after exposure of the bar for 72 hours to SANI-CLOTH AF3 at a temperature of 23° C. under 1% strain compared to a non-exposed reference tested at the same condition, and a tensile elongation retention of at least 75% after exposure of the bar for 72 hours to SANI-CLOTH AF3 at a temperature of 23° C. under 1% strain compared to a non-exposed reference tested at the same condition.

11. The thermoplastic composition of claim 1, wherein the composition is an extruded, a blow-molded, an injection-molded, rotational-molded, 3D printed and/or thermoformed composition.

12. The thermoplastic composition of claim 1, wherein the composition is comprised in an article of manufacture.

13. The thermoplastic composition of claim 12, wherein the article of manufacture is a health care product.

14. The thermoplastic composition of claim 12, wherein the article of manufacture is a transfusion joint, an A-V shunt, a balloon pump, a biosensor, a blood filter housing, a blood pump, a cannula, a catheter, a defibrillator lead, a dialyzer, a disc, an extra-corporeal device, a filter, a food tray, a guidewire, a hygienic barrier, a drug delivery pump, a diagnostic recorder, a cochlear implant, a drug delivery device, a glucose monitor, or a neurostimulator, an in-dwelling access device or a port, an intravenous connector, a ligature, a medical appliance, a medical equipment housing, a medical storage tray, a monitor housing, a pacemaker lead, a plate, a scaffolding, a shunt, a support, a valve, or an animal cage.

15. A thermoplastic composition comprising:

30 wt. % to 70 wt. % of a semi-crystalline polyester;

10 wt. % to 50 wt. % of a halogenated polycarbonate;

3 wt. % to 25 wt. % of a first poly(carbonate-siloxane) copolymer having a siloxane content of less than 30 wt. %, wherein the siloxane content is based on the total weight of the first poly(carbonate-siloxane) copolymer; and 3 wt. % to 25 wt. % of a second poly(carbonate-siloxane) copolymer having a siloxane content of 35 to 45 wt. %, wherein the siloxane content is based on the total weight of the second poly(carbonate-siloxane) copolymer, wherein the composition has a UL94 rating of V0 at a thickness of 1.5 mm, and wherein an ASTM tensile bar comprising the composition has a tensile strength retention of at least 80% after exposure of the bar for 168 hours to SANI-CLOTH AF3 at a temperature of 23° C. under 0.5% or 1% strain compared to a non-exposed reference tested at the same condition, and a tensile elongation retention of at least 65% after exposure of the bar for 168 hours to SANI-CLOTH AF3 at a temperature of 23° C. under 0.5% or 1% strain compared to a non-exposed reference tested at the same condition.

* * * * *